O. L. WHITEMAN.
GATE VALVE.
APPLICATION FILED MAY 18, 1918.
1,360,164.
Patented Nov. 23, 1920.
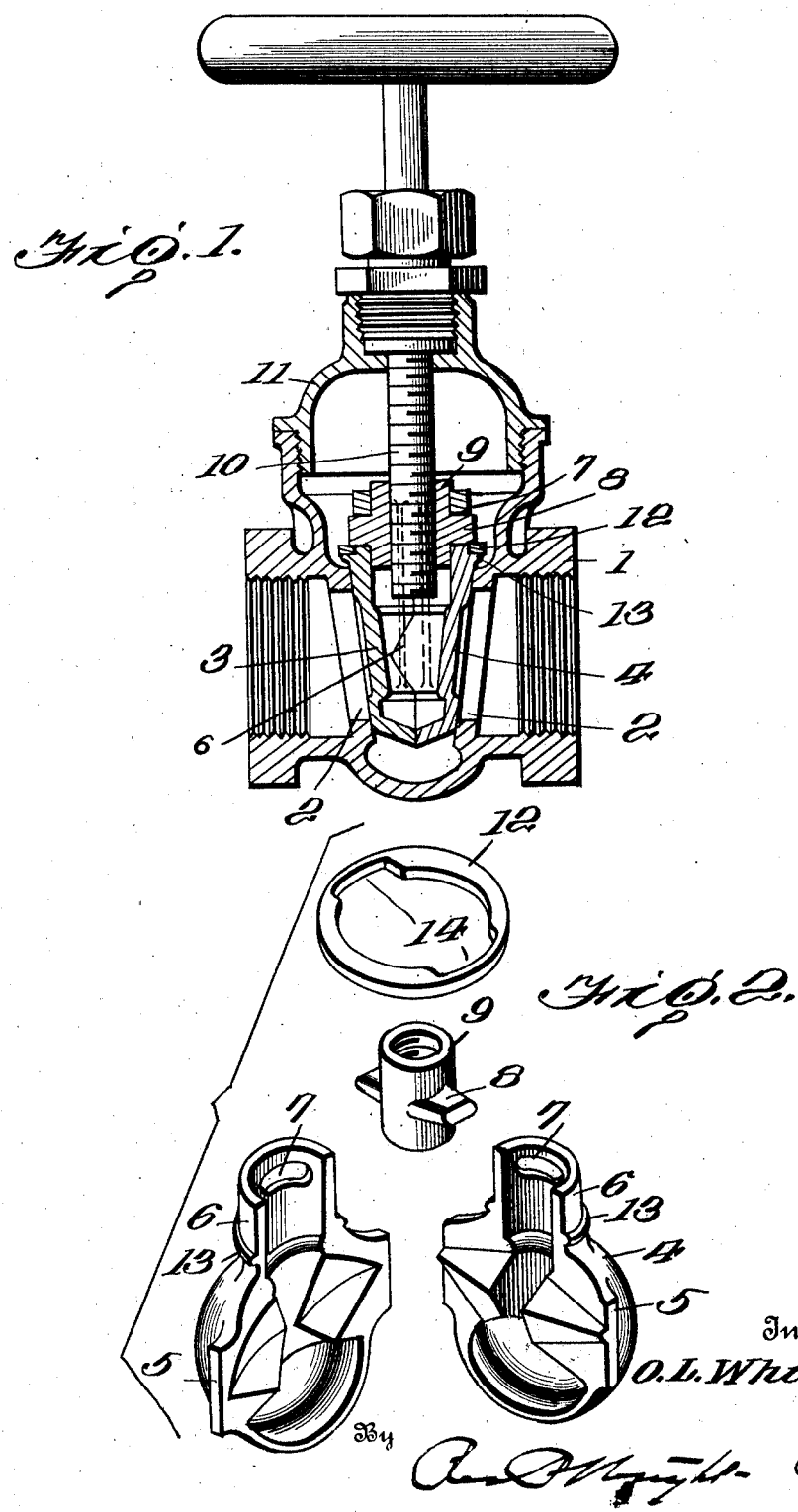

UNITED STATES PATENT OFFICE.

OWEN L. WHITEMAN, OF COXSACKIE, NEW YORK.

GATE-VALVE.

1,360,164. Specification of Letters Patent. Patented Nov. 23, 1920.

Application filed May 18, 1918. Serial No. 235,270.

*To all whom it may concern:*

Be it known that I, OWEN L. WHITEMAN, a citizen of the United States, residing at Coxsackie, in the county of Greene and State of New York, have invented certain new and useful Improvements in Gate-Valves, of which the following is a specification, reference being had therein to the accompanying drawing.

This invention relates to certain new and useful improvements in gate valves and is an improvement on the construction of gate valve as shown in my application filed February 4, 1918, Serial No. 215,320 which matured into Patent No. 1,304,228, patented May 20, 1919; the object being to provide novel means for limiting the spreading movement of the disks in order to prevent the disks from spreading to such an extent as to permit them to rub on the top of the seats of the body.

Another object of my invention is to provide a construction of gate valve in which the disks are so connected together that they are capable of rocking upon one another in a horizontal and vertical direction and yet move up and down as a solid gate.

Other and further objects and advantages of the invention will be hereinafter set forth and the novel features thereof defined by the appended claim.

In the drawings:

Figure 1 is a longitudinal vertical section through a gate valve constructed in accordance with my invention; and Fig. 2 is a perspective view of the gate disks, nut and locking ring detached.

Like numerals of reference refer to like parts in the several figures of the drawings.

In the drawing 1 indicates a valve casing provided with oppositely disposed converging valve seats 2 upon which are adapted to be seated valve gates or disks 3 and 4 which are provided with lugs 5 adapted to travel in contact with spaced guide flanges 6 formed on the interior of the valve casing.

The inner faces of the disks 3 and 4 are provided with coöperating bearing surfaces constructed substantially as shown in my application above referred to for allowing said disks to rock in a horizontal and vertical direction so that they will seat themselves properly upon the valve seats 2 of the casing. The disk valves 3 and 4 are provided with substantially semi-circular neck portions 6 provided with tapering oval-shaped portions 7, which are adapted to receive the tapering oval-shaped lugs 8 of a nut 9 which is mounted on the threaded lower end 10 of a valve stem, which in turn is mounted in a cap 11 carried by the casing.

When the substantially V-shaped bearing lugs of the disk 4 are arranged within the substantally V-shaped recesses of the disk 3 and the nut is in position in the neck portions of the disks, the lugs 8 project outwardly beyond the outer faces of the neck portions, as clearly shown.

In order to provide means for holding the disks together in order to prevent the same from separating to limit the spreading movement of the disks when in position within the casing, I arrange a locking ring 12 over the neck portions and it is adapted to be seated on the rib portions 13 of the neck portions of the disks as clearly shown in Fig. 1. The ring is provided with oppositely disposed notches 14 in order to allow the ring to pass over the ends of the lugs 8 of the nut 9, and by giving the ring a quarter turn the notches are moved out of alinement with the lugs so as to fasten the ring in position upon the neck portions of the disks which limits outward movement of the disks in respect to each other and connects the disks so that they can be removed without separating or becoming detached from the nut, which greatly facilitates the assembling of the valve and overcomes the difficulty existing in large gate valves, as the disks are prevented from spreading to such an extent that they will rub on the top of the valve seats.

From the foregoing description it will be seen that I have provided a gate valve having a pair of valve disks provided with bearing surfaces to allow the disks to rock in a horizontal and vertical direction, said disks being mounted on a nut and loosely connected together in such a manner that the disks are free to rock and are yet prevented from spreading so as to injure the valve seat in the operation of the valve.

I claim:

A gate valve comprising a valve casing having a valve seat and a gate valve arranged to coact therewith, said gate valves being provided with apertured neck portions having annular ribs, an operating nut arranged in said neck portions provided with oppositely disposed lugs extending into the apertures thereof and a flat locking ring having notches to receive said lugs adapted to be placed in position over said neck portion of said disk upon said ribs and turned for loosely holding said disk in position upon said nut.

In testimony whereof I hereunto affix my signature in the presence of two witnesses.

OWEN L. WHITEMAN.

Witnesses:
WILLIAM H. SALISBURY,
ERNEST MILLER.